Figure 1:
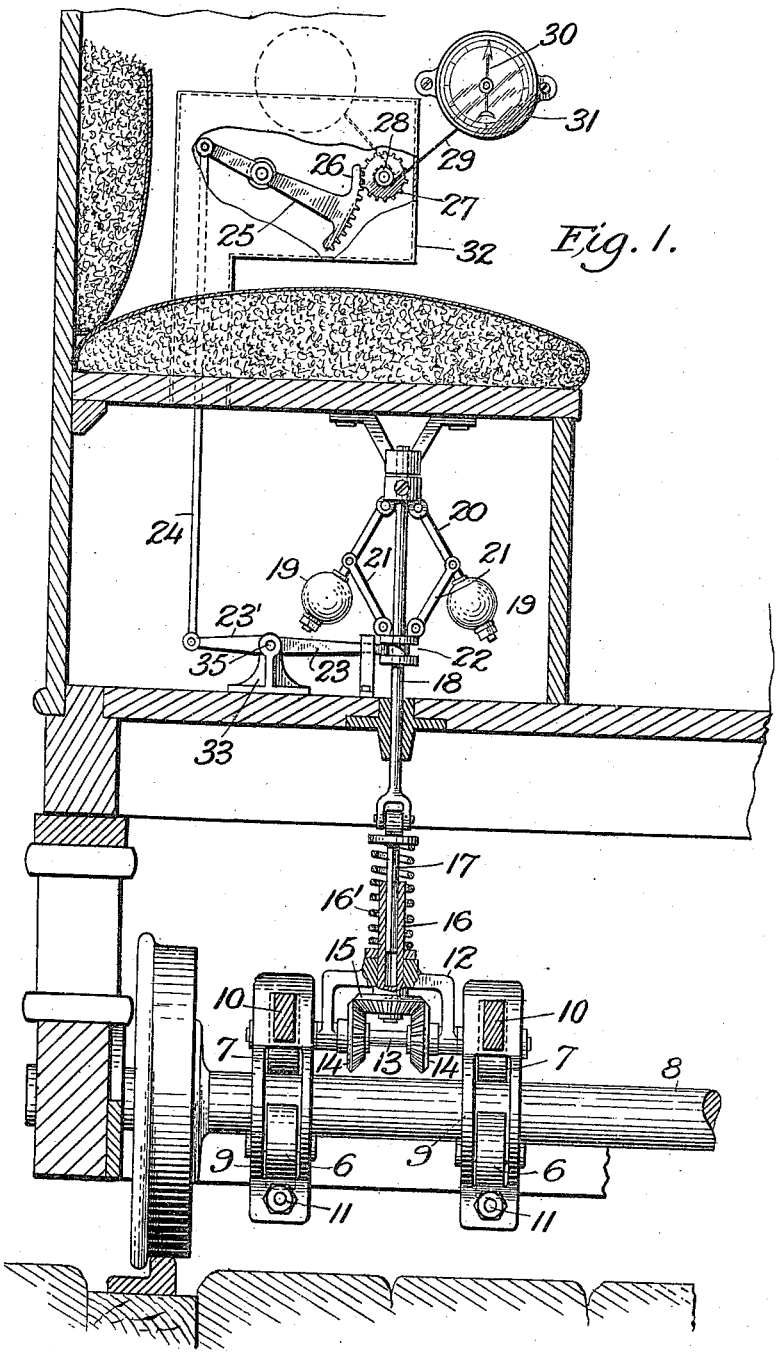

R. OMIZZOLO.
GEARING.
APPLICATION FILED APR. 13, 1909.

987,484.

Patented Mar. 21, 1911.
2 SHEETS—SHEET 2.

WITNESSES

INVENTOR,
Richard Omizzolo,
BY
Victor J Evans
ATTORNEY

UNITED STATES PATENT OFFICE.

RICHARD OMIZZOLO, OF LINCOLN, NEW JERSEY.

GEARING.

987,484.  Specification of Letters Patent.  Patented Mar. 21, 1911.

Application filed April 13, 1909. Serial No. 489,600.

*To all whom it may concern:*

Be it known that I, RICHARD OMIZZOLO, a subject of the King of Italy, residing at Lincoln, in the county of Middlesex and State of New Jersey, have invented new and useful Improvements in Gearing, of which the following is a specification.

Figures 2, 3:
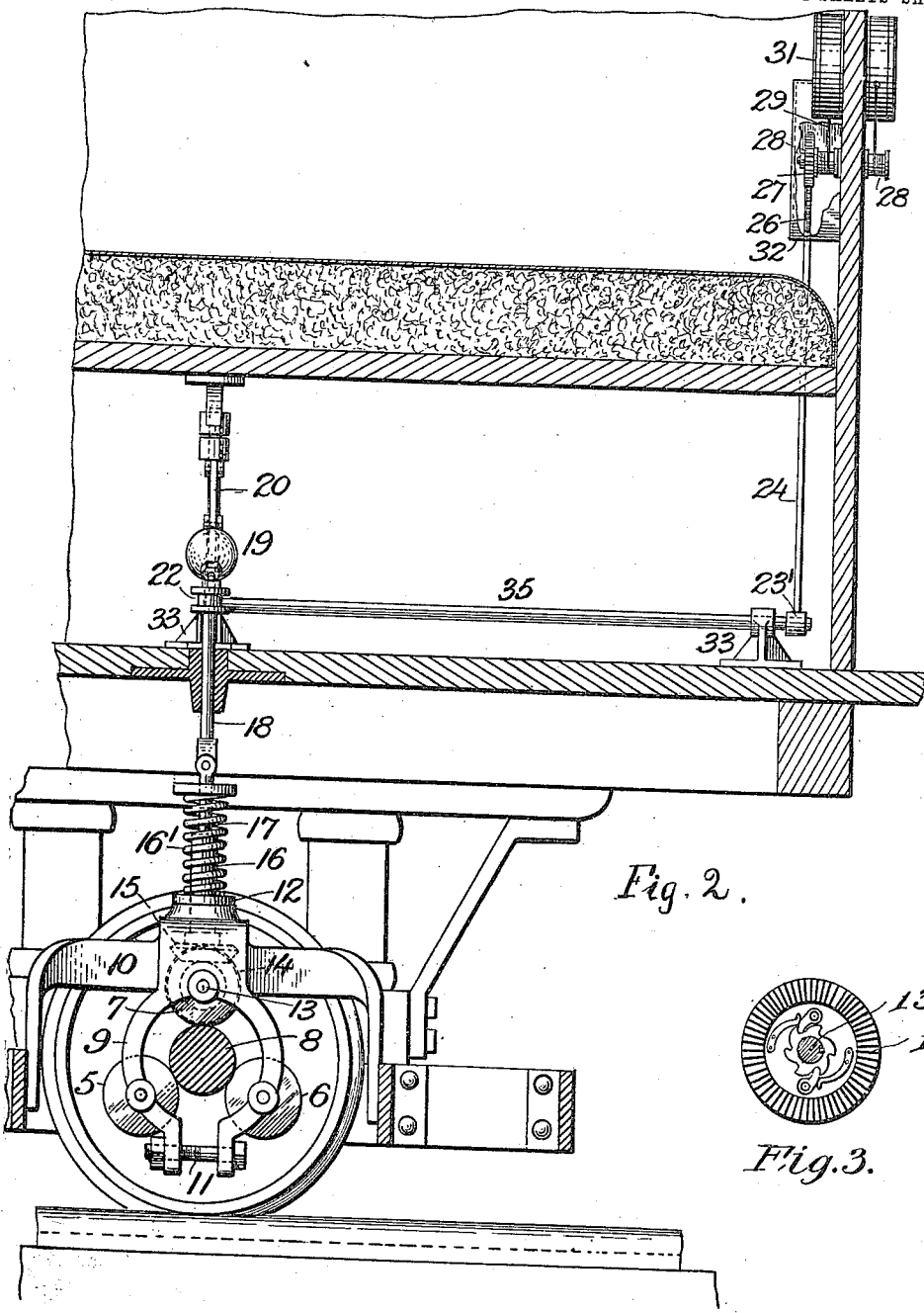

This invention relates to speed indicators and it is adapted to be attached to the body of a car or other vehicle and has certain parts driven and rotated by the wheels or axles so as to operate a ball governor and the centrifugal action of the balls to operate the hand of a dial. The degree of movement of the hand indicates the speed at which the balls are being rotated and the wheels or axles are moving. These and other details and objects of the invention are more fully described in the following specification, set forth in the claims and illustrated in the drawings, where:

Figure 1 is a view of the device looking from the front of the car. Fig. 2 is a sectional view through the car looking at the side of the indicator mechanism. Fig. 3 is a detail view, showing the ratchet connection between the shaft 13 and one of the bevel gears mounted thereon.

The device is adapted to be applied to any wheeled vehicle but for convenience it is shown as attached to a street car and motion is imparted to the two sets of friction rollers 5, 6 and 7 by the axle 8 of the car. The rollers are carried by yokes 9 suspended from cross pieces 10 on the truck of the car and the lower ends of the yoke carry an adjusting bolt 11 to draw them together so that the friction of the rollers is increased or diminished. Located between the two yokes is a frame 12 and journaled in same is the shaft 13 of the upper rollers 7 which carries the two beveled pinions 14 which are adapted to be alternately connected with the shaft by any well known means according to the direction in which the shaft is rotated so that they drive the pinion 15 in one direction only no matter in which direction the car is moving. The stem 16 of the pinion 15 has a telescopic connection 17 connected with the vertical shaft 18 of the governor whose balls 19 are hung at the lower ends of the levers 20 that are connected by means of the links 21 with a sliding collar 22 controlling the lever 23 secured to one end of a shaft 35 whose other end carries an arm 23′ having at its outer end the rod 24 that operates a lever 25 with a toothed segment 26. The teeth of the segment mesh with a pinion 27 on the shaft of drums 28 carrying cords 29 which encircle the pivots of the indicator hands 30.

If desired two indicator dials may be provided for the car, one on the outside for the use of the motorman and the other inside for the passengers, and the cords 29 run in different directions toward their respective hands to turn them in the proper direction. The lever 25 and its segment may be inclosed in a casing 32, and the shaft 35 is supported by bearings 33 on the floor of the car. A spring 16′ retains the shaft 18 in its proper place in the car body regardless of the up and down movement of the truck.

It is obvious that the details may be otherwise arranged or modified without departing from the essential features above described.

What I claim as new and desire to secure by Letters Patent is:

1. In combination a rotary part, a shaft mounted parallel with the rotary part and movable toward and away therefrom, a yoke mounted upon said rotating part and having the shaft journaled thereto, rotary elements mounted upon the shaft and yoke and arranged about said rotating part and in frictional contact therewith, and means for contracting the yoke to compensate for wear between the rotating part and the said rotary elements.

2. In combination a rotating part, a yoke mounted upon the rotating part, rotary elements mounted upon said yoke and in frictional contact with the rotating part, means for contracting the yoke to compensate for wear between the rotary elements and the rotating part, a shaft mounted in the yoke and connected with one of the rotary elements and operated thereby, and a telescopic stem having one of its members geared to the said shaft.

3. In combination a rotating part, yokes mounted upon the rotating part, rotary elements mounted upon the yokes and arranged about the rotating part and in frictional contact therewith, means for contracting the yokes, a shaft parallel with the rotating part and connected to opposite rotary elements, a frame mounted upon said shaft, a telescopic stem mounted upon said frame, and means connecting a member of the telescopic stem with said shaft.

In testimony whereof I affix my signature in presence of two witnesses.

RICHARD OMIZZOLO.

Witnesses:
HOWARD I. BRAMPTON,
ALLAN W. ORD.

Copies of this patent may be obtained for five cents each, by addressing the "Commissioner of Patents, Washington, D. C."